Figure 1:
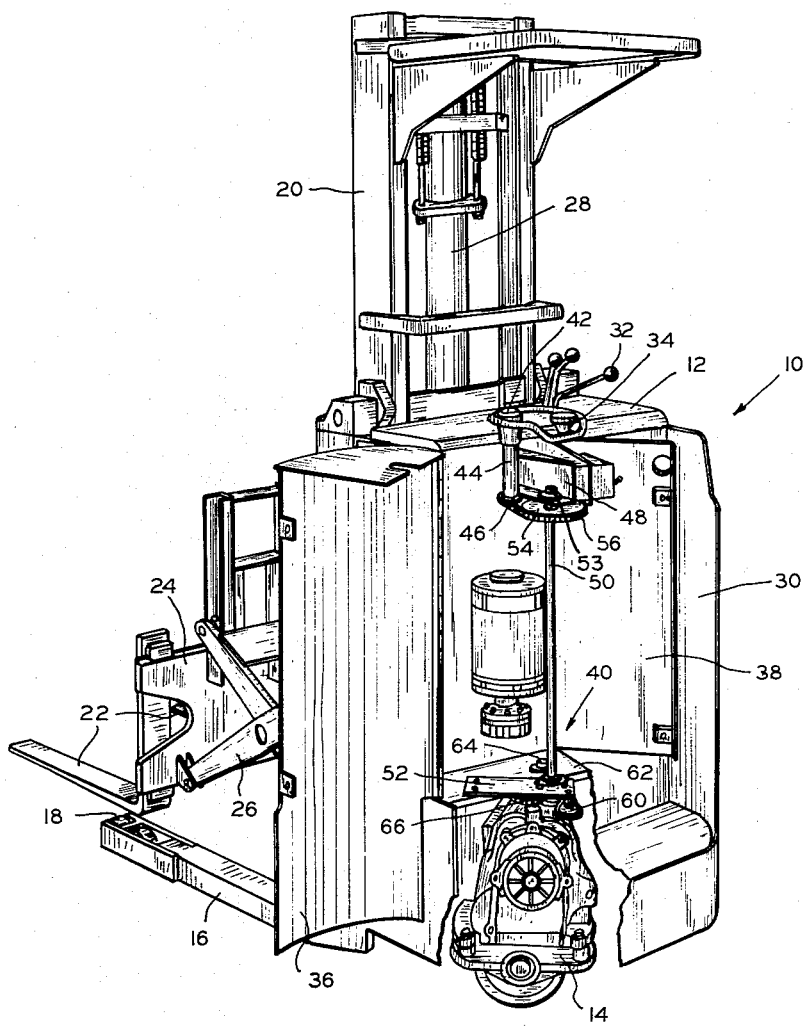

April 26, 1966  H. J. THOMAS  3,248,123
STEERING MECHANISM FOR INDUSTRIAL LIFT TRUCK
Filed June 1, 1964  2 Sheets-Sheet 1

INVENTOR
HENRY J. THOMAS
BY
Kenneth C. Witt
ATTORNEY

April 26, 1966     H. J. THOMAS     3,248,123
STEERING MECHANISM FOR INDUSTRIAL LIFT TRUCK
Filed June 1, 1964     2 Sheets-Sheet 2

INVENTOR
HENRY J. THOMAS
BY Kenneth C. Witt
ATTORNEY

United States Patent Office 3,248,123
Patented Apr. 26, 1966

3,248,123
STEERING MECHANISM FOR INDUSTRIAL LIFT TRUCK
Henry J. Thomas, Battle Creek, Mich., assignor to Clark Equipment Company, a corporation of Michigan
Filed June 1, 1964, Ser. No. 371,438
3 Claims. (Cl. 280—92)

This invention relates to steering mechanisms, and more specifically to a steering mechanism which is easily adjusted for intuitive forward or reverse steering and especially suitable for use with certain types of industrial lift trucks.

In an industrial lift truck a lift upright ordinarily is provided adjacent the front end thereof with a pair of forwardly extending load engaging members or tines and a dirigible wheel or wheels are provided adjacent the rear end thereof. Industrial trucks used to pick up, stack and transport a wide variety of loads in commercial applications, in factories, warehouses and the like. Consequently, they must be highly and easily maneuverable in order to be as productive as possible. For this reason it is generally desirable that the steering of the lift truck be intuitive for the direction of travel, either forward or reverse, in which the truck is operated most of the time. For example, if the steering mechanism is arranged for intuitive forward steering, rotation of the operator's steering control wheel in a given direction will cause the lift truck to turn in the same direction when the lift truck is traveling forwardly. Usually, a lift truck is operated most of the time in a forward direction, and so lift trucks conventionally are provided with intuitive forward steering. There are circumstances, however, which make it desirable to have the lift truck travel in a reverse direction most of the time, as, for example, when the lift truck is used to carry large bulky loads which tend to obscure the operator's vision when traveling in a forward direction. Therefore, it is desirable to have a steering mechanism which is easily changed from intuitive forward steering to intuitive reverse steering. A principal object of my invention is to provide a steering mechanism which may easily be changed from intuitive forward steering to intuitive reverse steering.

Another object of my invention is to provide an improved steering mechanism, the connection of which to a dirigible wheel may be easily reversed.

In carrying out my invention in a preferred embodiment thereof, I provide a first sprocket connected to dirigible wheel means for conjoint pivotal movement therewithout about a steering axis. A plate member is pivotally connected to vehicle frame means adjacent the first sprocket and provided with a lock member for holding it in position. A second sprocket and idler are rotatably connected to the plate member and a continuous sprocket chain connects the first and second sprockets.

Figure 2:
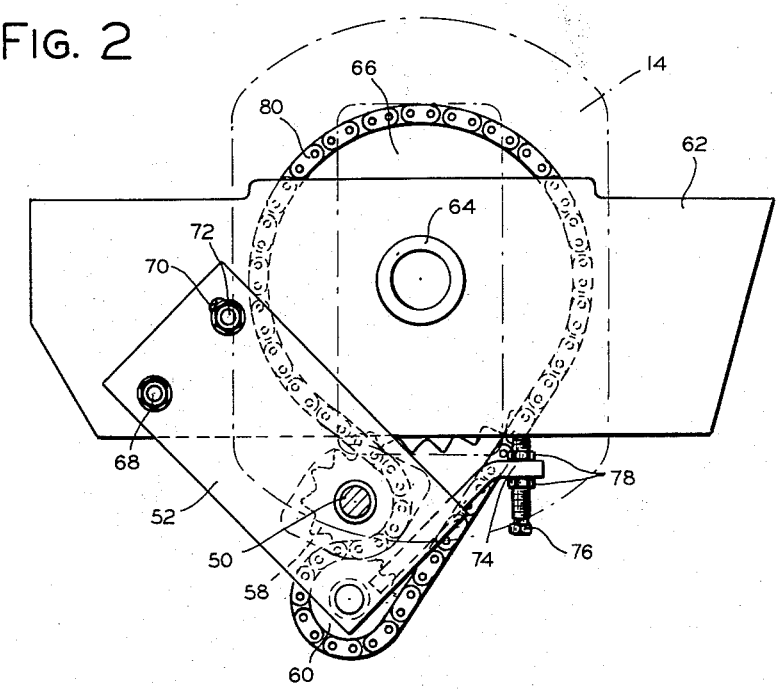
Figure 3:
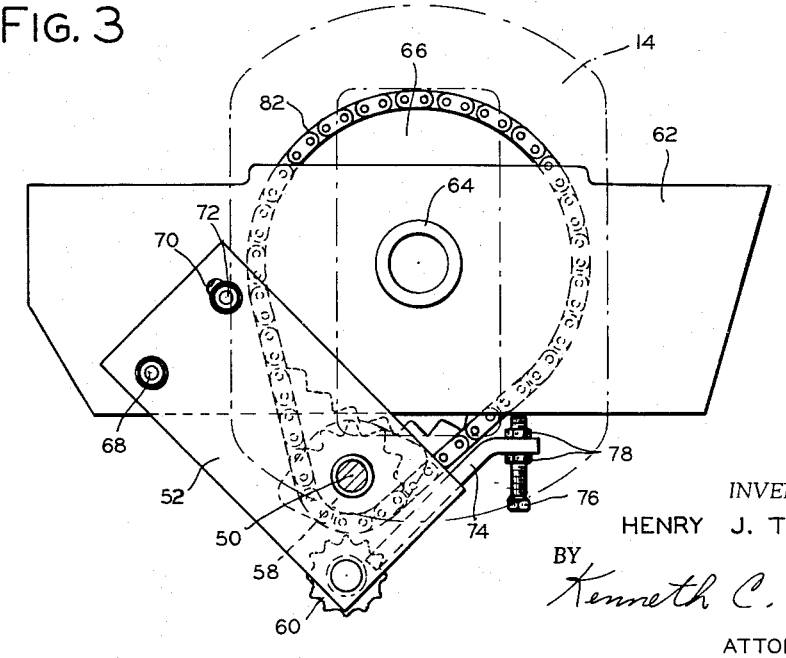

The above and other objects, features and advantages of my invention will be more clearly understood when the following detailed description is considered in conjunction with the accompanying drawing wherein:

FIGURE 1 shows a perspective view of an industrial lift truck embodying my improved steering mechanism, FIGURE 2 shows a portion of my steering mechanism with the sprocket chain trained in a particular manner, and FIGURE 3 is similar to FIG. 2, except that the sprocket chain is trained in a different manner.

Referring to FIG. 1, reference numeral 10 denotes generally an electric industrial lift truck of the stand-up rider type. Lift truck 10 includes a body portion 12 which is supported at the rear end thereof by a dirigible power wheel assembly 14 which is connected to the frame thereof for pivotal movement about a substantially vertical steering axis and a caster wheel, not shown. The forward end of body 12 is supported by a pair of forwardly extending outriggers 16, only one of which is shown, to which a pair of tandem trail wheels 18 are connected.

Connected to the front end of body 12 is lift upright 20 which includes a pair of load engaging fork arms or tines 22 mounted on a plate 24 which is connected to a carriage member (not shown) by means of a scissors mechanism 26. Scissors mechanism 26 serves to extend fork arms 22 forwardly relative to lift truck 10 or retract them to a position adjacent the carriage member. The carriage member is connected to a vertically disposed single acting fluid motor 28 by means of a sprocket and chain arrangement so that extension of fluid motor 28 causes a vertical elevation of the carriage member and fork arms 22.

An operator's station 30 is provided at the right rear corner of body 12 and furnishes a place at which the lift truck operator may stand and operate the truck controls. Conveniently located adjacent operator's station 30 are various controls including a vehicle speed and direction control level 32 and an operator's steering control wheel or member 34. At this point it will be noted that control cover panels 36 and 38 are shown in opened positions in order to fully expose the steering mechanism 40 of which steering control wheel 34 is a part.

Referring now also to FIGS. 2 and 3, steering mechanism 40 will be described in detail. Steering control wheel 34 is connected to the upper end of a shaft 42 which is rotatably journaled in a tubular member 44. The lower end of shaft 42 extends past tubular member 44 and has a sprocket 46 fixed to it. Tubular member 44 is fixed to a bracket 48 which in turn is fixed to truck body 12. A substantially vertically extending shaft 50 is rotatably journaled at the upper end thereof in bracket 48 and is rotatably journaled adjacent the lower end thereof in a plate support member 52. In order to maintain proper vertical alignment of shaft 50 upon horizontal adjustment of the lower end of shaft 50, the upper end of shaft 50 is journaled in a bearing 53 which is mounted on bracket 48 for sideways adjustment. Fixed to the upper end of shaft 50 is a sprocket 54 which is connected to sprocket 46 by means of a continuous sprocket chain 56 so that rotation of steering control wheel 34 in a given direction will cause shaft 50 to rotate in the same direction. Also, a sprocket 58 is connected to the lower end of shaft 50 which extends below plate 52 so that it is, in effect, rotatably connected to plate member 52. In addition to sprocket 58 an idler 60 is rotatably connected to plate member 52 and may be toothed or not, as desired.

Power wheel assembly 14 is pivotally journaled in a vehicle frame member 62 by means of a shaft 64. A sprocket 66 is disposed beneath frame member 62 and connected to power wheel assembly 14 for conjoint pivotal movement therewith.

Plate member 52 is pivotally connected to frame member 62 by means of a nut and bolt assembly 68 so that plate member 52 may be pivoted toward or away from sprocket 66 with the result that the distances of sprocket 58 and idler 60 from sprocket 66 can be varied. An elongated slot 70 in plate member 52 cooperates with a nut and bolt assembly 72 to provide a means for locking plate 52 in position. Secured to plate member 52 by any suitable means, such as welding, is a bar 74 through which a machine screw 76 is threaded. Machine screw 76 is disposed so that it abuts the adjacent edge of frame member 62 and is held in position by means of a pair of lock nuts 78 disposed on opposite sides of bar 74.

Sprocket 58 can be connected to sprocket 66 by means of a continuous sprocket chain trained either as shown in FIG. 2 or as shown in FIG. 3, as desired.

Referring now to FIG. 2, sprocket 58 is connected to sprocket 66 by means of a continuous sprocket chain 80. Sprocket chain 80 is trained around sprocket 66, around sprocket 58 in one direction and around idler 60 in the opposite direction, as shown in FIG. 2. Thus, when sprocket 58 is rotated in a clockwise direction, as viewed in FIG. 2, sprocket 66 will be caused to pivot in a counterclockwise direction. Since rotation of steering control wheel 34 causes sprocket 58 to rotate in the same direction, it will not be evident that rotation of steering control wheel 34 in a given direction causes power wheel assembly 14 to pivot in the opposite direction. Consequently, this will provide intuitive forward steering of lift truck 10.

Referring to FIG. 3, sprocket 58 is connected to sprocket 66 by means of a continuous sprocket chain 82 which is identical to sprocket chain 80, except that it is somewhat shorter in length. As a matter of fact sprocket chain 82 may be formed from sprocket chain 80, if desired, merely by removing an appropriate number of the links from spocket chain 80. Sprocket chain 82 is trained around sprockets 58 and 66 only so that clockwise rotation of sprocket 58 (as viewed in FIG. 3) causes clockwise rotation of sprocket 66. In view of the foregoing detailed description, it will be evident that rotation of steering control wheel 34 in a given direction causes pivotal movement of power assembly 14 in the same direction, thereby providing intuitive reverse steering for lift truck 10.

At this point will be readily appreciated that I have disclosed an extremely simple and compact steering mechanism which can be readily changed from intuitive steering for forward vehicle travel to intuitive steering for reversing vehicle travel merely by changing the length of the chain connecting sprockets 58 and 66 and the manner in which the chain is trained over the sprockets. Further, it will be evident that the slack in the chain, whether arranged as shown in FIGS. 2 or 3, may be readily adjusted by loosening lock nuts 78 and assembly 72 and then threading machine screw 76 further into or out of bar 74, as required.

The above-detailed description sets forth a single preferred embodiment of my invention, and is intended to be illustrative only. Various modifications and rearrangements to my invention, including relocation of the various sprockets within limits, will occur to persons skilled in the art, but still be within the scope of my invention. Therefore, the scope of my invention should be determined only from the following appended claims when taken in conjunction with the prior art.

I claim:

1. For use with a vehicle having frame means and a dirigible wheel pivotally connected to the frame means, a steering mechanism comprising a support pivotally secured to the frame means, means for locking said support in position relative to the frame means, first wheel means operably connected to the dirigible wheel for conjoint pivotal movement therewith, second wheel means rotatably connected to the said support radially outwardly from the said first wheel means, a steering control wheel operatively connected to the said second wheel means, third wheel means rotatably connected to the said support radially outwardly from the said first and second wheel means and adjacent the said second wheel means, the said second and third wheel means being connected to the said support at locations spaced from the pivot connection of the said support to the frame means in substantially the same direction, and tension means connecting the said first, second and third wheel means.

2. In a vehicle having frame means and dirigible wheel means connected to the frame means for pivotal movement about a steering axis, a steering mechanism comprising a support member pivotally connected to the frame means, means for locking the said support member in position relative to the frame means, a first sprocket connected to the wheel means for conjoint pivotal movement about the steering axis, a second sprocket rotatably connected to the said support member, the said second sprocket being operatively connected to a steering control wheel, an idler sprocket rotatably connected to the said support member, the said second sprocket and idler sprocket being connected to the said support member at locations spaced in the same general direction from the pivot connection of the said support member to the frame means, and a sprocket chain connecting the said sprockets.

3. A vehicle having frame means and dirigible wheel means connected to the frame means for pivotal movement about a steering axis, a steering mechanism comprising a first spocket connected to the wheel means for conjoint pivotal movement therewith, a support connected to the frame means for pivotal movement toward or away from the said first sprocket, means cooperating with the said support and the frame means for locking the said support in position, a second sprocket rotatably connected to the said support, said second sprocket being operatively connected to an operator's steering control member so that rotation of the said steering control member causes rotation of the said second sprocket, an idler sprocket rotatably connected to the said support, the said second sprocket and idler sprocket being connected to the said support at locations spaced from the pivot connection of the said support to the frame and on the same side of the said pivot connection, and a continuous sprocket chain trained around the said sprockets in such a manner that the said chain passes around the said second sprocket in one direction and around the said idler sprocket in the opposite direction.

References Cited by the Examiner

UNITED STATES PATENTS

| | | | |
|---|---|---|---|
| 771,233 | 10/1904 | Davidson. | |
| 1,119,151 | 12/1914 | Halbleib | 74—242.15 X |
| 1,139,596 | 5/1915 | Stephens | 74—226 |
| 1,297,095 | 3/1919 | Carr | 74—498 |
| 1,307,944 | 6/1919 | Watson | 180—52 |
| 1,699,834 | 1/1929 | Dieckmann | 74—242.15 X |
| 2,024,213 | 12/1935 | Gettys | 74—221 |
| 2,331,734 | 10/1943 | Schroeder | 280—96 X |
| 2,913,063 | 11/1959 | Brown | 280—93 |
| 2,959,425 | 11/1960 | Rogant | 280—87 |
| 3,130,981 | 4/1964 | Christenson et al. | 180—52 X |

FOREIGN PATENTS

| | | |
|---|---|---|
| 423,579 | 2/1911 | France. |
| 440,604 | 5/1912 | France. |

KENNETH H. BETTS, *Primary Examiner.*